(12) United States Patent
Pomerantz (10) Patent No.: US 6,567,953 B1
(45) Date of Patent: May 20, 2003

(54) METHOD AND APPARATUS FOR HOST-BASED VALIDATING OF DATA TRANSFERRED BETWEEN A DEVICE AND A HOST

(75) Inventor: Gregory M. Pomerantz, New City, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,600

(22) Filed: Mar. 29, 2000

(51) Int. Cl.⁷ .............................................. G11C 29/00
(52) U.S. Cl. ....................... 714/805; 714/763
(58) Field of Search .................... 714/48, 763, 807, 714/808, 805, FOR 102; 365/201

(56) References Cited

U.S. PATENT DOCUMENTS

| | | | |
|---|---|---|---|
| 5,784,390 A | * | 7/1998 | Masiewicz et al. ............ 710/29 |
| 5,928,372 A | * | 7/1999 | Yoshida ....................... 714/704 |
| 6,175,883 B1 | | 1/2001 | Kvamme et al. |
| 6,182,267 B1 | * | 1/2001 | Kidd et al. .................... 714/52 |
| 6,192,492 B1 | | 2/2001 | Masiewicz et al. |
| 6,209,046 B1 | | 3/2001 | Sato et al. |

OTHER PUBLICATIONS

Peter T. McLean, Information Technology—AT Attachment with Packet Interface Extension (ATA/ATAPI–4), internal working document, Aug. 19, 1988, Revision 18, Maxtor Corporation, USA.

* cited by examiner

Primary Examiner—Christine T. Tu
Assistant Examiner—Matthew C. Dooley
(74) Attorney, Agent, or Firm—Blakely, Sokoloff, Taylor & Zafman LLP (57) ABSTRACT

According to one aspect of the present invention, a method is provided in which a device, in response to a read request issued by a host, transfers data to the host through a series of direct memory access (DMA) data in bursts. The host is allowed to interrupt the read command and determine whether a first portion has been transferred correctly from the device based upon an error code calculation transmitted from the device to the host during the termination phase of a data in burst.

25 Claims, 8 Drawing Sheets

METHOD AND APPARATUS FOR HOST-BASED VALIDATING OF DATA TRANSFERRED BETWEEN A DEVICE AND A HOST

FIELD OF THE INVENTION

The present invention relates generally to the field of data transfer technology. More specifically, the present invention relates to an apparatus, method, and system for host-based validation of data transferred between a storage device and a host.

BACKGROUND OF THE INVENTION

As computer devices and systems continue to advance and become more complex, effective and efficient techniques for transferring data between various components in computer systems have become more and more critical in system design and implementation. In particular, data transfer between an I/O device (e.g., a hard disk) and a host device (e.g., system memory) has been constantly examined and improved in order to improve the system's total performance and reliability. In the PC industry, the performance of the hard disk drive, which is the central I/O device of the PC, has become more and more important due to continual performance increases in the CPU, system memory and other various components of the PC.

The hard drive interface in a PC system provides the path for transferring data between a hard drive and system memory. The vast majority of PC systems today rely on the Advanced Technology Attachment (ATA), also referred to as the Integrated Drive Electronics (IDE), hard disk drive interface to transfer data between the hard disk and the system memory. Various data transfer protocols or standards have been developed to facilitate and control the various aspects of data transfer through an ATA/IDE interface. Data transfer protocols or standards such as the programmed input/output (PIO) and direct memory access (DMA) modes were developed to take advantage of the local bus architectures that replaced the original ISA bus. ATA interface modes have improved from PIO to DMA and now Ultra DMA, with data transfer rates up to 33.3 Mbytes/sec and 66.6 Mbytes/sec according to the Ultra ATA/33 and the Ultra ATA/66 protocols, respectively.

ATA-4 includes Ultra ATA/33 which uses both the rising and falling edges of the strobe signal as signal separators. Using both edges of the strobe signal effectively allows the available transition frequency to be doubled without increasing the frequency of the strobe, thus doubling the burst transfer rate. ATA-5 includes Ultra ATA/66 which doubles the Ultra ATA burst transfer rate by reducing setup times and increasing the strobe rate.

Currently, the existing ATA or DMA data transfer protocols only allows for validation of the data transferred between a device and a host to be performed by the device, not the host. Conventionally, the device is responsible for determining whether data has been transferred correctly at the end of a command (e.g., a read command) by comparing a cyclic redundancy code (CRC) value calculated by the host with a CRC value calculated by the device with respect to the data transferred. If the CRC values do not match, the device will set an error flag in its status register to indicate an error condition with respect to the data transferred. A software device driver or service routine on the host side can check the error flag in the status register of the device to determine if a CRC error has occurred with respect to the data transferred from the device. Since a read command can be very long, it is not efficient for the host to wait for the entire transfer to be completed before knowing from the device's status information whether the transfer is successful. This problem is significant considering that a disk read request issued by the host typically contains a demand portion (usually for a small amount of data) and a pre-fetch portion (usually for a large amount of data). In this instance, the transfer of the demand portion will have completed long before the entire transfer (including the transfer of the pre-fetch portion) is completed. Currently, there is no mechanism according to the existing ATA or DMA data transfer protocols for the host side to determine at some intermediate point (e.g., at the point when the demand portion is completed) if the data already received from the device was correctly transferred or not. Since the pre-fetched data is speculative, in order to avoid incurring a performance penalty, the host should not have to wait for the completion of the pre-fetch data before it can proceed to use the demand-fetched data. In addition, as the pre-fetch length is long and the CPU power continues to increase, it is increasingly likely that a request for subsequent data (i.e., a pre-fetch hit) will be submitted by the host while the pre-fetch transfer is still in progress. Since most transfer lengths initiated by the host are typically small, the transfer of subsequent requested data which is a pre-fetch hit would have been completed before the entire pre-fetch request is completed. The host should not have to wait for the entire transfer to complete before allowed to proceed with the portion of the data transfer which is pre-fetch hit. Similarly, when a request is issued which is not a pre-fetch hit, the host should not have to wait for the entire pre-fetch transfer to complete before it can abort the pre-fetch request in progress and proceed with servicing the new request.

SUMMARY OF THE INVENTION

According to one aspect of the present invention, a method is provided in which a device, in response to a read request issued by a host, transfers data to the host through a series of direct memory access (DMA) data in bursts. The host is allowed to interrupt the read command and determine whether a first portion has been transferred correctly from the device based upon an error code calculation transmitted from the device to the host during the termination phase of a data in burst.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be obvious to one skilled in the art that the present invention may be understood and practiced without these specific details.

In the discussion below, the teachings of the present invention are utilized to implement a method, apparatus, and a system for host-based validation of data transferred between a storage device and a host. In one embodiment, in response to a read command issued by the host, the device transfers data to the host through a series of DMA data in bursts according to the Ultra DMA data transfer protocol. The requested amount of data, in one embodiment, contains a demand portion and a pre-fetch portion. The host, in one embodiment, is allowed to interrupt the read command when certain predetermined criteria are satisfied to perform one or more functions. In particular, the host is allowed to interrupt the read command and terminate the data in burst upon completion of the demand portion to determine whether the demand portion has been transferred correctly from the device based upon an error code calculation transmitted from the device to the host during the termination phase of the data in burst. In one embodiment, the host keeps track of the progress of the data transfer to determine when the transfer of the demand portion is completed. Upon completion of the transfer of the demand portion, the host initiates the termination of the data in burst. The device transmits its error code calculation to the host upon termination of the data in burst. In one embodiment, to keep track of the progress of the data transfer, the host maintains a list having a set of entries that correspond to the demand portion of the data transfer. The demand portion of the data transfer is validated by the host based upon the error code calculation provided by the device upon termination of the data in burst. In one embodiment, the host validates the demand portion of the data transfer by comparing the error code calculation provided by the device with an error code calculated by the host. In one embodiment, the error code is a 16-bit cyclic redundancy check (CRC) code. The host and the device, in accordance with the Ultra DMA data transfer protocol, calculate a CRC value for each data in burst. While the present invention is described herein with respect to the Ultra DMA data transfer protocol, it should be appreciated and understood by one skilled in the art that the teachings of the present invention are also applicable to any scheme, method and system for transferring data between a storage device and a host that are compatible with the ATA or Ultra ATA data transfer protocols or standards. Moreover, the teachings of the present invention are not limited to the ATA or Ultra ATA data transfer protocols and can also be applied to the data transfer between other various components of the system.

Figure 1:
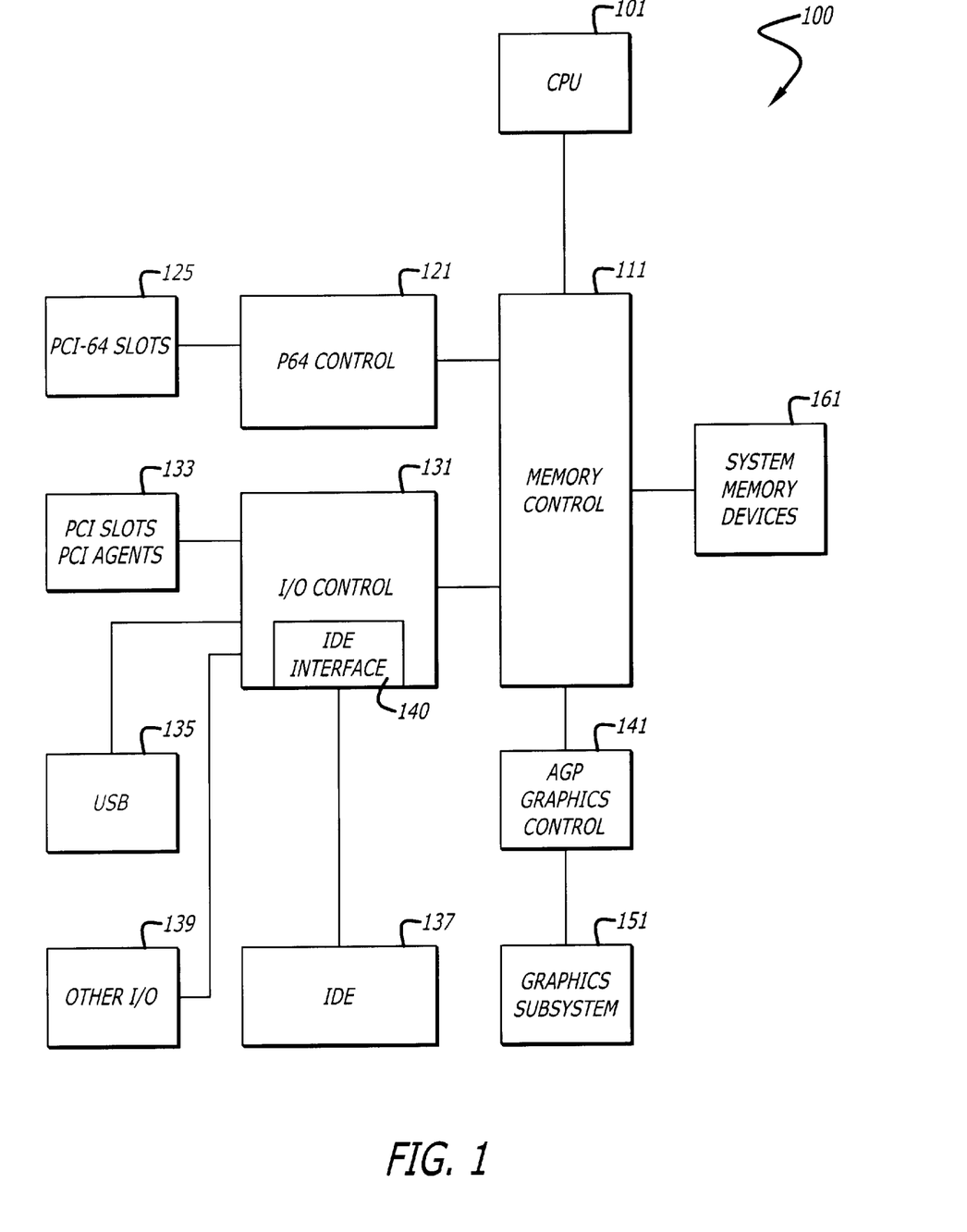
FIG. 1 is a block diagram of one embodiment of a system according to the teachings of the present invention.

FIG. 1 shows a block diagram of one embodiment of a system configuration in which the teachings of the present invention are implemented. The system configuration 100 includes one or more central processing unit (CPU) 101, a memory control hub (also referred to as memory control unit or memory controller) 111, a P64 control unit 121, an Input/Output (10) control unit 131, a graphics controller 141 coupled to a graphics subsystem 151, and a plurality of system memory devices 161. For the purposes of the present specification, the term "processor" or "CPU" refers to any machine that is capable of executing a sequence of instructions and shall be taken to include, but not be limited to, general purpose microprocessors, special purpose microprocessors, multi-media controllers and microcontrollers, etc. In one embodiment, the CPU 101 is a general purpose microprocessor that is capable of executing an Intel Architecture instruction set. The CPU 101, the P64 control unit 121, the IO control unit 131, and the AGP graphics control unit 141 access the system memory devices 161 via the memory control unit 111. The memory control unit 111, in one embodiment, is responsible for servicing all memory transactions that target the system memory devices 161. The memory control unit 111 can be a stand-alone unit, an integrated part of a chipset, or a part of some larger unit that controls the interfaces between various system components and the system memory devices 161. The P64 control unit 121 provides the interface control between a plurality of PCI-64 slots 125 and the memory control unit 111. The IO control unit 131 provides the interface control between the memory control unit 111 and various 10 devices and ports including the PCI slots and PCI agents 133, a plurality of USB ports 135, a plurality of IDE devices 137, and other 10 devices 139. The IO control unit 131, in one embodiment, contains an IDE host interface unit 140 that controls the interface between the IDE devices 137 and the memory control unit 111. The AGP graphics control unit 141 provides the interface control between the graphics subsystem 151 and the memory control unit 111. The IDE host interface unit 140 can be a stand-alone unit, an integrated part of a chipset, or a part of some larger unit that controls the interfaces between various IDE devices 137 and the system memory devices 161. The structure and functions of the IDE host interface unit 140 are described in greater detail below. For the purposes of the present specification, the IDE devices 137 are assumed to be Ultra ATA or Ultra DMA compatible, i.e., capable of transferring data to the host in accordance with the Ultra ATA and Ultra DMA data transfer protocol.

Figure 2:
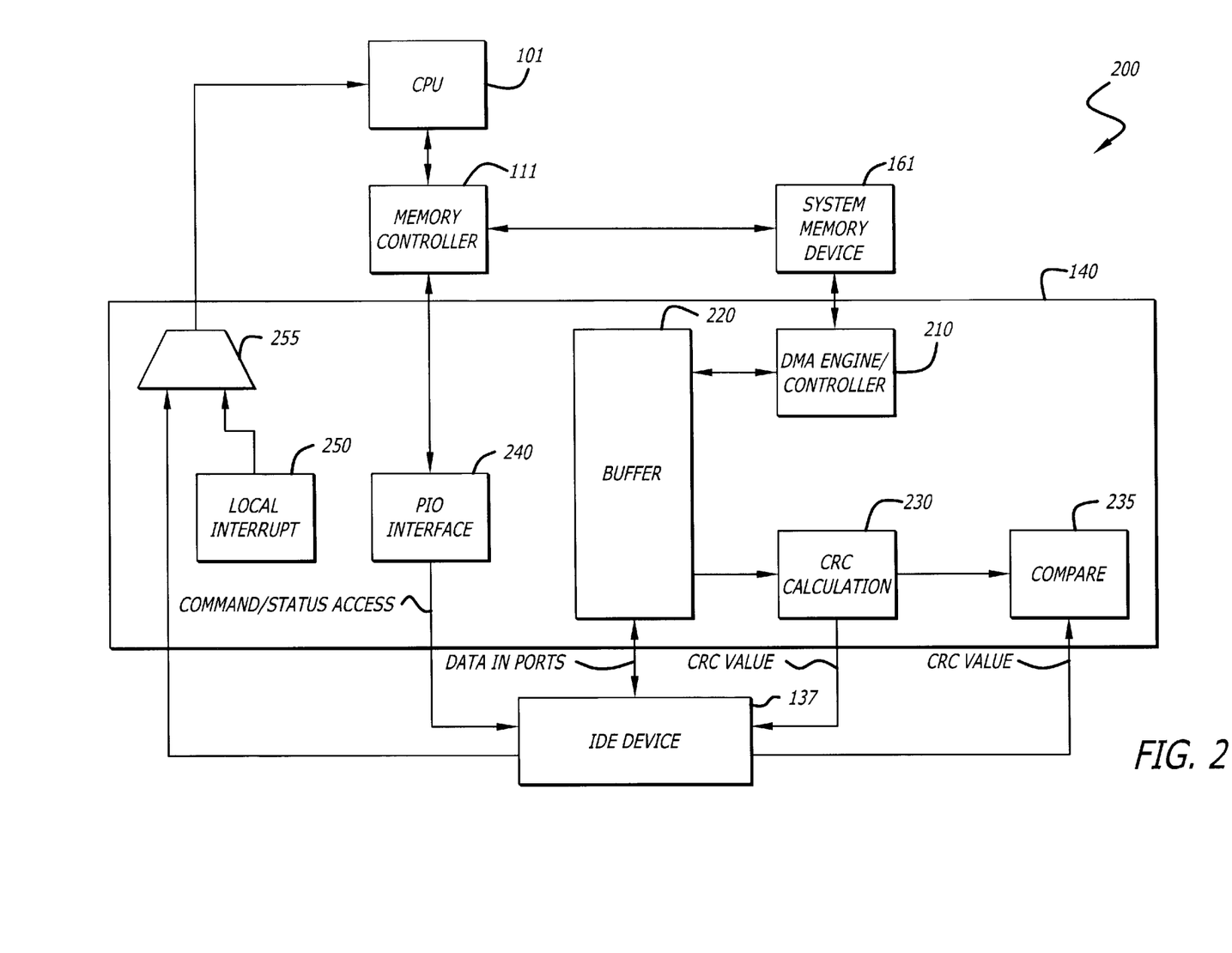
FIG. 2 shows a block diagram of one embodiment of an interface according to teachings of the present invention.

FIG. 2 shows a block diagram of one embodiment 200 of the IDE host interface unit 140 described in FIG. 1. In this embodiment, the IDE host interface unit 140 contains a DMA engine (also referred to as DMA controller) 210, a data buffer 220, CRC calculation logic 230, CRC compare logic 235, a PIO interface 240, multiplexer 255, and a local interrupt logic 250. In one embodiment, the DMA engine 210 is responsible for controlling and managing DMA data transfer between the system memory devices 161 and the various IDE devices 137 in accordance with the Ultra DMA data transfer protocol. In one embodiment, the DMA engine is configured to support both Ultra ATA/66 mode having a transfer rate of up to 66 Mbytes/sec and the Ultra ATA/33 mode having a transfer rate of up to 33 Mbytes/sec. The data buffer 220 is used for temporary storage of data transferred between the IDE devices 137 and the system memory devices 161. The CRC calculation logic 230 is used to provide data integrity information with respect to the data transferred by calculating a CRC value for each data burst. The CRC compare logic 235 is used to compare the CRC value calculated by the interface CRC calculation logic 230 with the CRC value calculated by the IDE device 137 to determine whether the respective data was transferred correctly from the device to the host. In the present embodiment, the device's CRC value is transmitted to the CRC compare logic 235 in the interface 140 during the termination phase of a data in burst. The PIO interface 240 provides the interface control with respect to the PIO data transfer mode.

In one embodiment, the PIO interface is configured to support all existing PIO data transfer modes including PIO Mode 4 with a transfer rate up to 14 Mbytes/sec. In one embodiment, the read/write commands and status access commands issued by the host are transmitted to the IDE devices 137 via the PIO interface 240. The local interrupt logic 250, in one embodiment, is responsible for generating an interrupt signal to the host when certain criteria are satisfied (e.g., when a demand portion of the data transfer is completed and/or when the entire data transfer is completed). Traditionally, as mentioned above, the storage device such as the IDE devices 137 are responsible for signaling the host (e.g., the processor, the memory control unit 111, or the IDE host interface 140, etc.) via an interrupt when the host needs to provide the storage devices with a service (e.g., such as at the end of a data transfer). Local interrupt generation allows the interrupt to be generated locally on the host side at various phases during a data transfer. Local interrupt generation relies on the DMA engine 210 to generate a host interrupt during a DMA transfer by annotating the scatter/gather list for the transfer to include an interrupt bit. When enabled, the bit would signal the DMA engine 210 to generate an interrupt upon completion of a corresponding scatter/gather entry. In one embodiment, multiple entries in the scatter/gather list may be flagged with the interrupt bit so that the interrupt signal to the host can be generated at various points during a data transfer for various purposes (e.g., signaling the host after a demand portion of the data transfer has been successfully completed or signaling the host after the entire data transfer has been successfully completed). As explained and discussed herein, according to the teachings of the present invention, one efficient mechanism of pre-fetching is to create a scatter/gather list for the DMA engine to keep track of the data transfer progress where the first entries in the list point to the destination data buffer area for the demand portion and the subsequent entries point to pre-fetch data buffer area. A single disk transfer request can then be made by the host for the demand portion plus the pre-fetch portion. To avoid incurring the pre-fetch performance penalty, the host side interface 140 is allowed to interrupt the read command and terminate the data in burst upon completion of the demand portion to determine whether the demand portion has been transferred correctly from the device. If the demand portion has been transferred correctly from the device as determined by the interface 140, the interface 140 can generate an interrupt signal to the host to indicate that the demand portion has been successfully completed so that the host can proceed to use the demand portion prior to the completion of the entire data transfer. Likewise, instead of having the device to perform data validation at the end of the entire data transfer, the teachings of the present invention can be implemented for the host side to validate the integrity of the entire data transfer at the end. The local interrupt capability included in the present embodiment of the invention can also be used to signal completion of the entire data transfer by the IDE host interface unit 140 rather than having the storage devices to maintain the transfer count information and determine the appropriate time to signal the host of a transfer completion the information and status of which the host side already controls. Accordingly, having a host-based validation of data transferred from the device at various points during a data transfer not only reduces the complexity and cost of the storage devices but also provides a very efficient and flexible mechanism for data pre-fetching.

Figure 3:
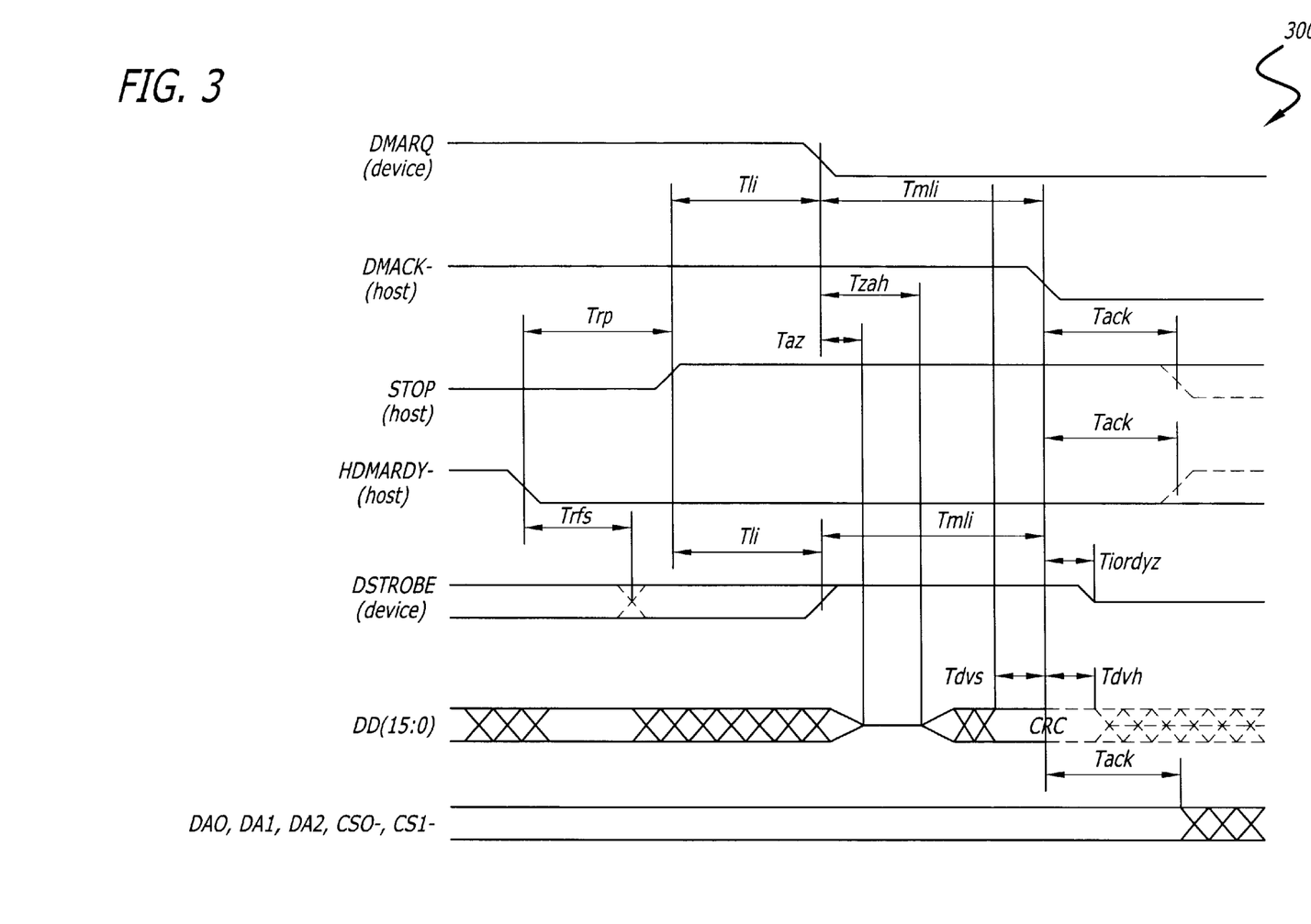
FIG. 3 illustrates a timing diagram of various data and control signals when a host terminates a data in burst according to existing Ultra ATA/DMA data transfer

FIG. 3 shows an example of a timing diagram of various control and data signals illustrating various timing requirements when a host terminates a data in burst in accordance with existing Ultra DMA data transfer protocols. As shown in FIG. 3, various control signals include a DMA request signal (DMARQ) controlled by the IDE storage device, a DMA acknowledge signal (DMACK) controlled by the host, a STOP signal controlled by the host, a DMA ready signal (HDMARDY) controlled by the host, a data strobe signal (DSTROBE) controlled by the storage device. Also shown in FIG. 3 are the 16-bit data lines DD(15:0) that are driven either by the device or the host at various times during a data transfer depending upon the direction of the data transfer and the phase of the data transfer. A READ DMA or WRITE DMA command or data transfer for a PACKET command is accomplished through a series of Ultra DMA data in or data out bursts. Each burst has three phases of operation: the initiation phase, the data transfer phase, and the burst termination phase. The burst may be optionally paused during the data transfer phase. In the present discussion, an Ultra DMA burst is defined as the period from an assertion of the DMACK signal to the subsequent negation of DMACK. The burst initiation phase begins with the assertion of the DMARQ signal by the device and ends when the sender toggles the STROBE signal to transfer the first data word (i.e., the DSTROBE signal in the case of data in burst). The data transfer phase is in effect from after the burst initiation until the burst termination. Either agent (either the host or the device) may terminate a burst. This is not the same as command termination or completion. If the burst termination occurs before the command is complete, the command will be completed by initiation of a new burst (resumption of the data transfer) at some later time or aborted by the host issuing a reset to the device. There are four phases to the termination of the burst: (1) termination request, (2) termination acknowledged, (3) STROBE signal returned to asserted state, and (4) sending of CRC value on negation of DMACK.

Continuing with the present discussion, the burst termination should not be initiated by the host until at least one data word of the burst has been transferred. As shown in FIG. 3, the host initiates the burst termination by negating the HDMARDY signal. The device stops its toggling of DSTROBE signal within Trfs nanoseconds (ns) after the host negates HDMARDY signal. Trfs is defined as the ready-to-final STROBE time (i.e., no more STROBE edges may be sent after Trfs after the HDMARDY signal is negated by the host). The host then asserts the STOP signal no sooner than Trp ns after negating HDMRDY. Trp is defined as the ready-to-pause time (i.e., the time until a receiver may assume that the sender has paused after negation of HDMARDY signal). According to the Ultra DMA/33 specification, the host will not negate STOP again until after the current data burst is terminated. The device will negate the DMARQ signal within Tli ns after the STOP signal has been asserted by the host. Tli is defined as the limited interlock time (i.e., time allowed between an action by one agent (either host or device) and the following action by the other agent). The device will not assert DMARQ again until after the current data burst is terminated. If DSTROBE is negated, the device will assert DSTROBE within Tli ns after STOP has been asserted by the host. No data will be transferred during this transition. The host will ignore this transition on DSTROBE. With continuing reference to FIG. 3, the device will release DD(15:0) no later than Taz ns after negating DMARQ. Taz is defined as the maximum time for outputs to release. The host will then drive DD(15:0) no sooner than Tzah ns after the device has negated DMARQ. Tzah is defined as the minimum delay time required for output drivers to turn on from released state. The host will then place the result of its CRC calculation on DD(15:0). The host will negate DMACK signal no sooner than Tmli ns after the device has asserted DSTROBE and negated DMARQ and the host has asserted STOP and negated HDMARDY, and no sooner than Tdvs ns after the host places the result of its CRC calculation on DD(15:0). Tmli is defined as the interlock time with minimum. Tdvs is defined as the data valid setup time. The device will then latch the host's CRC data from DD(15:0) on the negating edge of DMACK. The CRC data provided by the host will be compared with the CRC data calculated by the device to determine whether the transfer of the data burst is successful. If the CRC value calculated by the host and the CRC value calculated by the device do not match, the device will keep track of this error condition for reporting at the end of the command.

Figure 4:
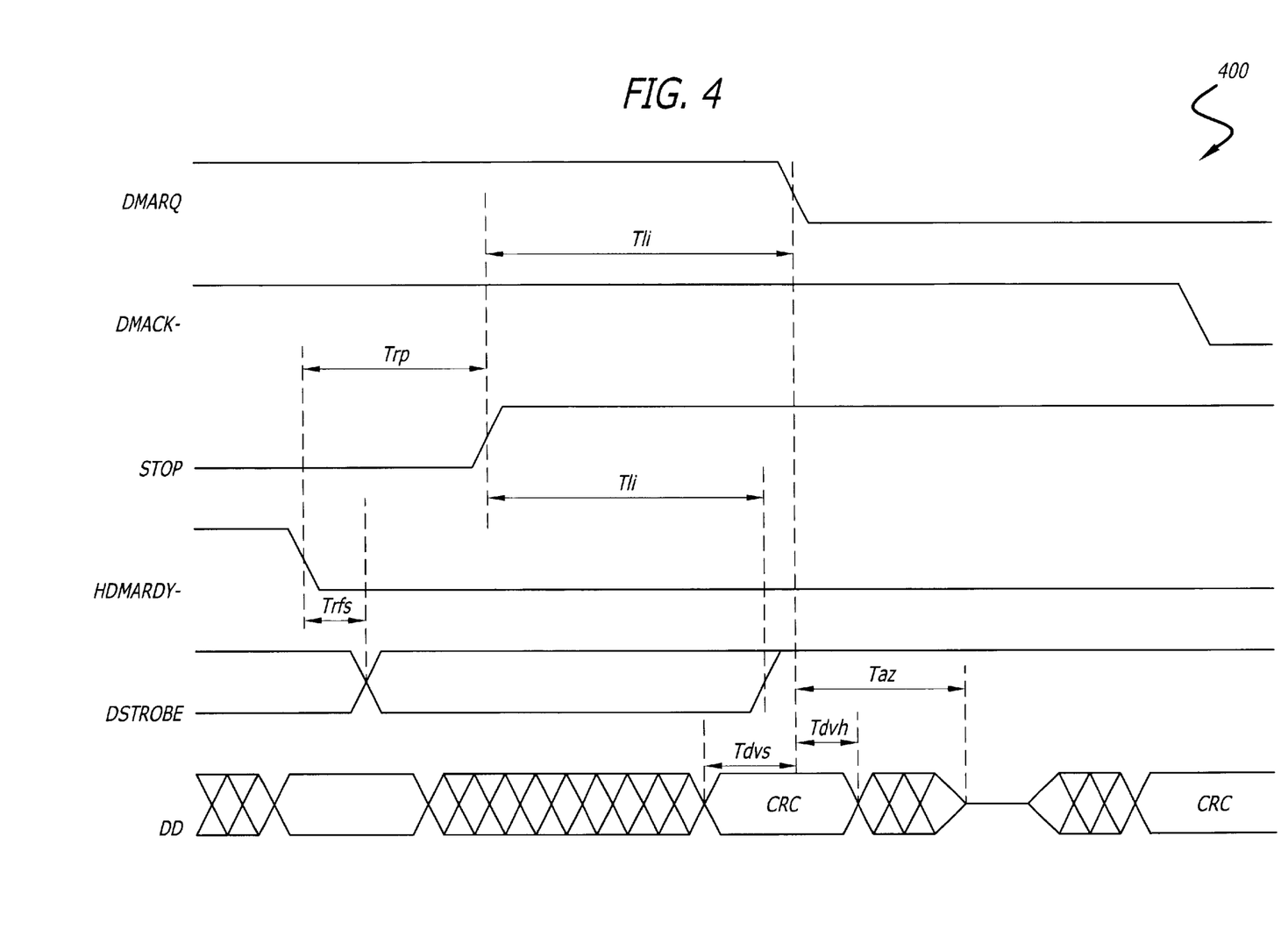
FIG. 4 shows a timing diagram of various data and control signals when a host terminates a data in a burst according to the teachings of the present invention.

FIG. 4 is a timing diagram of various control and data signals according to the teachings of the present invention to allow for host-based validation of data transferred from the device when a data in burst is terminated by the host side. As shown in FIG. 4, various control signals include a DMA request signal (DMARQ) controlled by the IDE storage device, a DMA acknowledge signal (DMACK) controlled by the host, a STOP signal controlled by the host, a DMA ready signal (HDMARDY) controlled by the host, a data strobe signal (DSTROBE) controlled by the storage device. Also shown in FIG. 4 are the 16-bit data lines DD(15:0) that are driven either by the device or the host at various times during a data transfer depending upon the direction of the data transfer and the phase of the data transfer. Data transfer between the device and the host is accomplished through a series of Ultra DMA data in or data out bursts. Each burst has three phases of operation: the initiation phase, the data transfer phase, and the burst termination phase. The burst may be optionally paused during the data transfer phase. In the present discussion, an Ultra DMA burst is defined as the period from an assertion of the DMACK signal to the subsequent negation of DMACK. The burst initiation phase begins with the assertion of the DMARQ signal by the device and ends when the sender toggles the STROBE signal to transfer the first data word (i.e., the DSTROBE signal in the case of data in burst). The data transfer phase is in effect from after the burst initiation until the burst termination. Either agent (either the host or the device) may terminate a burst. This is not the same as command termination or completion. If the burst termination occurs before the command is complete, the command will be completed by initiation of a new burst (resumption of the data transfer) at some later time or aborted by the host issuing a reset to the device.

Continuing with the present discussion, the burst termination should not be initiated by the host until at least one data word of the burst has been transferred. As shown in FIG. 3, the host initiates the burst termination by negating the HDMARDY signal. The device stops its toggling of DSTROBE signal within Trfs nanoseconds (ns) after the host negates HDMARDY signal. Trfs is defined as the read-to-final STROBE time (i.e., no more STROBE edges may be sent after Trfs after the HDMARDY signal is negated by the host). The host then asserts the STOP signal no sooner than Trp ns after negating HDMRDY. Trp is defined as the ready-to-pause time (i.e., the time until a receiver may assume that the sender has paused after negation of HDMARDY signal). The device will negate the DMARQ signal within Tli ns after the STOP signal has been asserted by the host. Tli is defined as the limited interlock time (i.e., time allowed between an action by one agent (either host or device) and the following action by the other agent). The device will not assert DMARQ again until after the current data burst is terminated. If DSTROBE is negated, the device will assert DSTROBE within Tli ns after STOP has been asserted by the host. No data will be transferred during this transition. The host will ignore this transition on DSTROBE. The device will place its CRC calculation value on the DD(15:0) at least Tdvs ns before negating DMARQ. The host will then latch the device's CRC value on the negating edge of DMARQ. According to the existing Ultra DMA specification, the DD(15:0) data lines are driven by the IDE device during this time but their values are undefined. Thus the present invention allows an IDE device to transmit a CRC calculation back to the host during the termination phase of a data in burst while still maintaining full backward compatibility with existing IDE host interfaces (i.e., without the need for a configuration register in the device to enable/disable host-based CRC checking). The CRC data provided by the device will be compared with the CRC data calculated by the host to determine whether the transfer of the data burst is successful.

Figure 5:
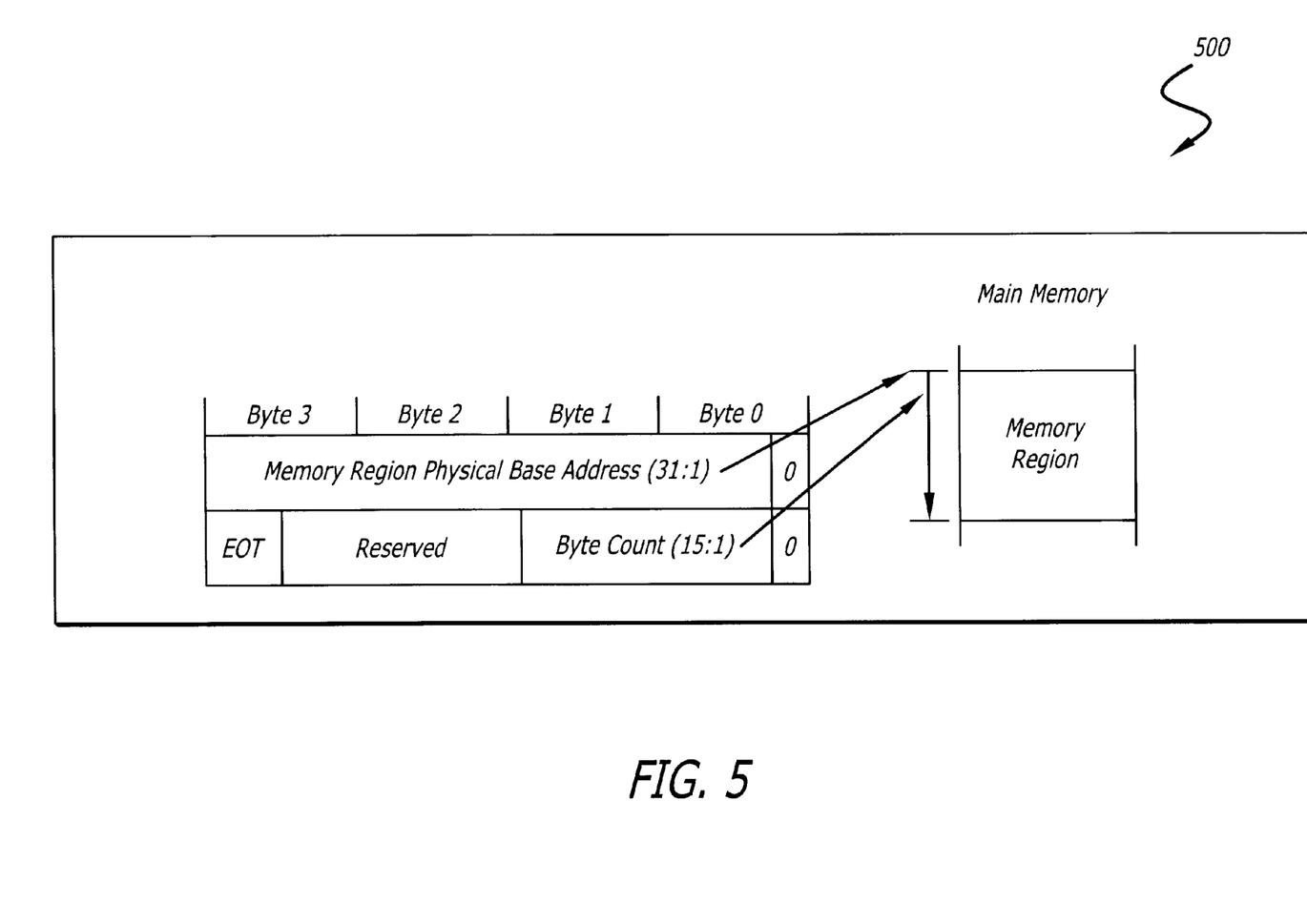
FIG. 5 shows an example of a physical region descriptor (PRD) table according to one embodiment of the present invention.

FIG. 5 illustrates a physical region descriptor (PRD) table (also referred herein as the scatter/gather list) that contains one or more PRD entries (PRDs). In one embodiment, the data transferred between the host and the device are grouped into one or more physical memory regions. Each physical memory region to be transferred between the host and the device is described by a PRD. The PRDs are stored sequentially in the PRD table (the scatter/gather list). Normally, the data transfer proceeds until all regions described by the PRDs in the table have been transferred or completed. However, as described herein, to implement an efficient pre-fetching mechanism according to the teachings of the present invention, the PRD table will be annotated so that the host side DMA engine can generate an interrupt and terminate a data in burst upon the completion of a particular PRD entry (i.e., at the completion of the transfer of a particular physical memory region).

In one embodiment, the PRD table is aligned on 64-Kbyte boundaries. Each PRD entry in the table is 8 bytes in length. The first 4 bytes in a PRD entry specify the byte address of a physical memory region. In one embodiment, this memory region is DWord aligned and does not cross a 64-Kbyte boundary. The next 2 bytes in the PRD entry specify the size or transfer count of the region in bytes. In one embodiment, the size of transfer count is 64-Kbyte limit per region. A value of 0 in these 2 bytes indicates 64 Kbytes (thus the minimum transfer count is 1). If bit 7 (EOT) of the last byte is a 1, it indicates that this is the final PRD in the Descriptor table. In one embodiment, the total sum of the byte counts in every PRD of the descriptor table is equal to or greater than the size of the disk transfer request. The DMA controller transfers data to or from system memory responding to the DMA requests from the IDE device. When the last data transfer for a memory region has been completed on the IDE interface, the next PRD is fetched from the table. The controller then begins transferring data to or from that PRD's memory region. Traditionally, the IDE device signals an interrupt once its programmed data count has been transferred. In one embodiment, in response to the interrupt, the system software or operating system resets the start/stop bit in the command register. It then reads the DMA controller status and then the IDE drive status to determine if the transfer completed successfully.

Conventionally, as described above, the IDE device is responsible for signaling the host via an interrupt when the host needs to provide the IDE device with a service request (e.g., at the end of a data transfer). However, according to the teaching of the present invention, local interrupt logic is implemented on the host side (i.e., within the IDE host interface unit) so that the host side can generate interrupt locally at various phases during a data transfer from the IDE device. In the present embodiment, the appropriate PRD entries in the PRD table are annotated by including an interrupt bit so that upon completion of the transfer of corresponding physical memory region, the interrupt bit is set to allow the host side to generate an interrupt signal at the appropriate points during the data transfer. Specifically, the PRD entry corresponding to the demand portion of a data transfer request may be flagged with the interrupt bit. When the transfer of the physical memory region corresponding to the demand portion is completed, the interrupt bit is enabled to signal the DMA controller to generate an interrupt. As such, the host side does not have to wait for the entire data transfer to be completed. It can proceed with the demand portion as soon as the transfer of the demand portion is completed as indicated by the interrupt bit included in the corresponding PRD entry for the demand portion. Similarly, the local interrupt generation mechanism described herein can also be used to signal the host at other points during a data transfer including the end of the entire data transfer. Accordingly, multiple PRD entries in the PRD table may be flagged with an interrupt bit so that a local interrupt can be generated at the completion of the corresponding PRD entries (i.e., when the transfer of the physical memory region described by the corresponding PRD entries is completed). By annotating the scatter/gather list and having the local interrupt capability, the host can monitor the progress of a data transfer from an IDE device and can take appropriate actions at various points during the data transfer. The host does not have to wait until the entire data transfer is completed before it can proceed to use the demand portion that has been successfully transferred from the IDE device. Likewise, when a request is issued which is not a pre-fetch hit, the host can abort the pre-fetch in progress and proceed with servicing the new request. As the pre-fetch is aborted, the portion of the pre-fetch data that has already been completed can be preserved as successfully loaded data rather than being discarded.

Figure 6:
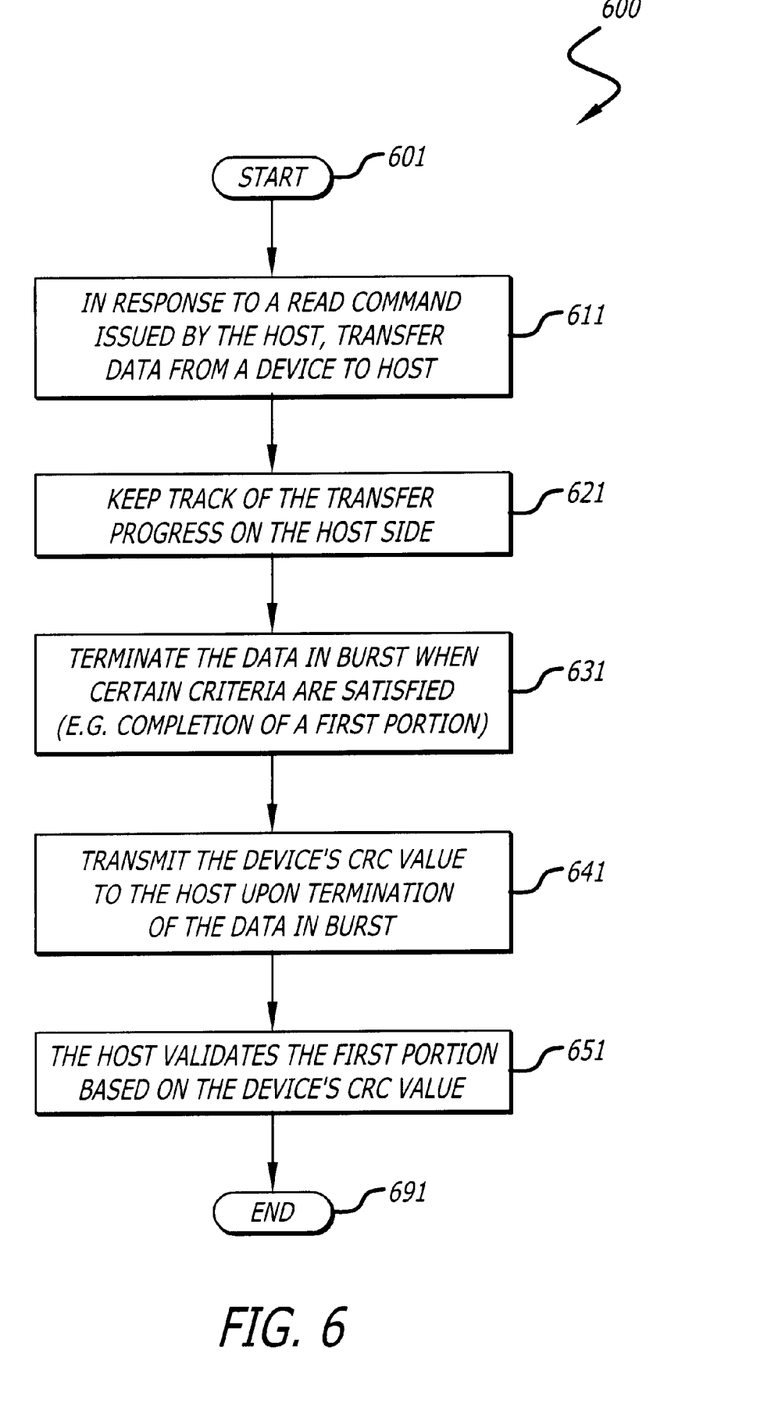
FIG. 6 is a flow diagram of one embodiment of a method for transferring data between a device and a host in accordance with teachings of the present invention.

FIG. 6 shows a flow diagram of one embodiment of a method 600 for transferring data from a storage device to a host. The method 600 starts at block 601 and proceeds to block 611. At block 611, in response to a read command issued by the host, the device executes the read command to transfer a requested amount of data to the host through a series of DMA data in bursts. Each data in burst includes an initiation phase, a data transfer phase, and a termination phase. At block 621, the host keeps track of the progress of the data transfer from the device. In one embodiment, as explained above, the host keeps track of the progress of the data transfer from the device using PRD table (the scatter/gather list) that is annotated to keep track of when the transfer of one or more particular physical memory regions is completed. As described above, the transfer status of one or more particular physical memory regions can be kept track of by including an interrupt bit in the corresponding PRDs in the PRD table. As described herein, the read request issued by the host can contain a demand portion and a pre-fetch portion. At block 631, the host terminates the data in burst when certain criteria are satisfied, for example, when the transfer of the demand portion has been completed. To improve the performance of the data transfer, the host should not have to wait until the entire data transfer is completed before proceeding with the demand portion which will have completed long before the completion of the pre-fetch portion. In one embodiment, the PRD corresponding to the demand portion of the read request is annotated with an interrupt bit. This interrupt bit will be enabled or activated when the transfer of the demand portion is completed. In response to the interrupt bit in the appropriate PRD being turned on, the host side terminates the data in burst to determine whether the demand portion has been transferred correctly from the device. This method can also be used to interrupt the data transfer at other points including the point at which the pre-fetch portion or the entire data transfer is completed. As explained above, terminating a data burst does not terminate the transfer but rather results in the transfer being suspended until it is resumed again. At block 641, the device transmits its CRC value to the host upon the termination of the data in burst. The exchange of the control signals and the device's transmission of the CRC value during the termination phase of a data in burst initiated by the host is described above with respect to FIG. 4. At block 651, the host compares the host's CRC value with the device's CRC value to determine whether the transmission of the demand portion was successful. Similarly, the method 600 can be utilized to allow for host-based CRC checking at the end of the entire data transfer or at other points during the data transfer based on other criteria.

Figure 7:
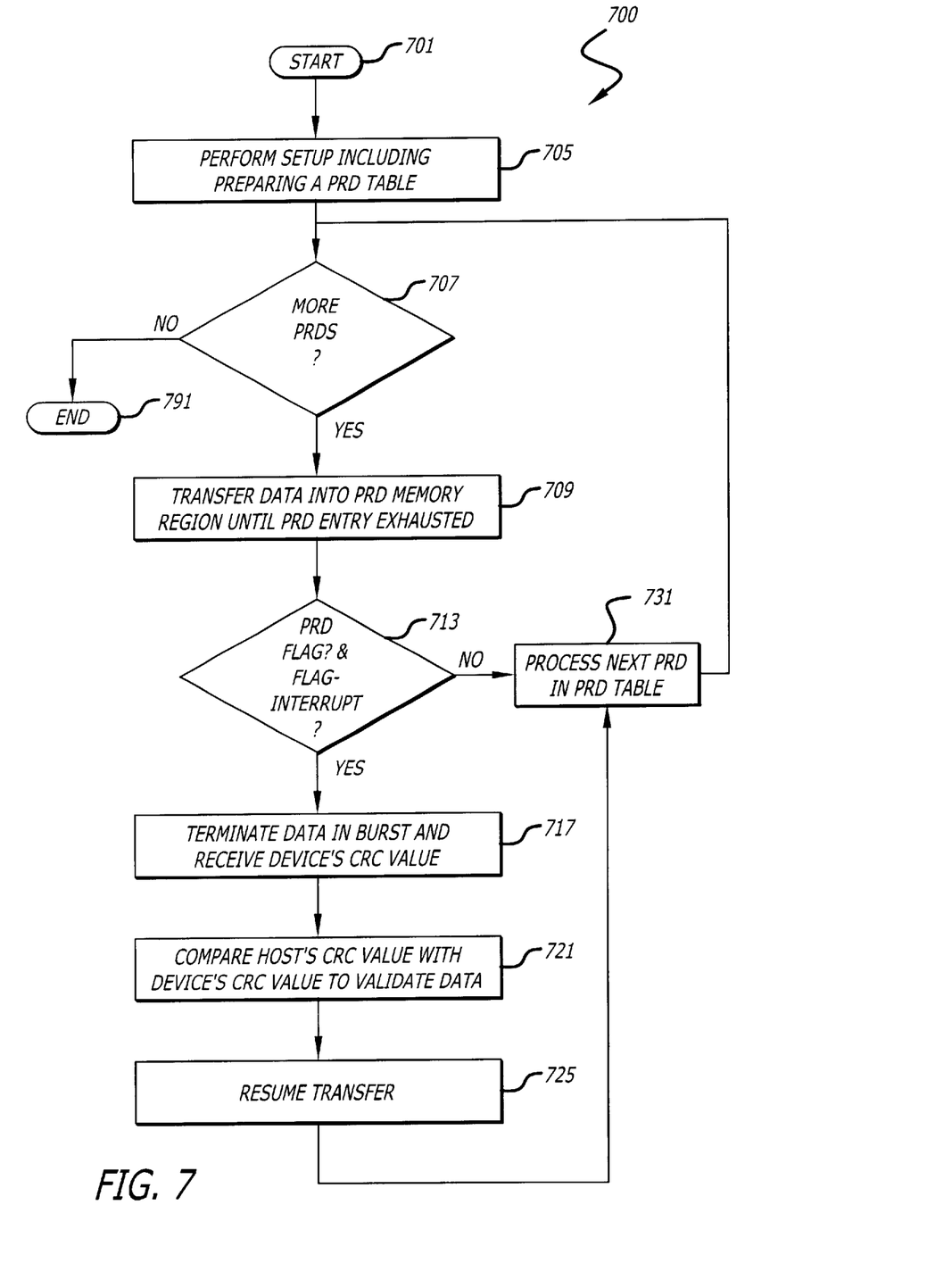
FIG. 7 is a flow diagram of one embodiment of a process performed by a DMA controller according to the teachings of the present invention.

FIG. 7 shows a flow diagram illustrating the operations of DMA engine on the host side according to one embodiment of the present invention. The process 700 starts at block 701 and proceeds to block 705 to perform setup and start receiving data transferred from the device. At block 707, if there are no more data transferred from the device (i.e., no more PRDs), the process 700 proceeds to end at block 791. Otherwise the process 700 proceeds to block 709. At block 709, the DMA engine continues to transfer data received from the device into the physical memory region described by the corresponding PRD until the corresponding PRD is exhausted. At block 713, if the corresponding PRD entry is flagged with the interrupt bit and the interrupt bit is activated in response to the completion of the corresponding physical memory region, then the process 700 proceeds to block 717. Otherwise the process 700 proceeds to block 731. At block 717, the current data in burst is terminated and the host's receives the device's CRC value transmitted to the host upon termination of the data in burst as described above with respect to FIG. 4. At block 721, the host compares its CRC value with the device's CRC value to determine whether the transfer was successful. At block 725, the data transfer between the device and the host is resumed. At block 731, the next PRD in the PRD table is processed.

Figure 8:
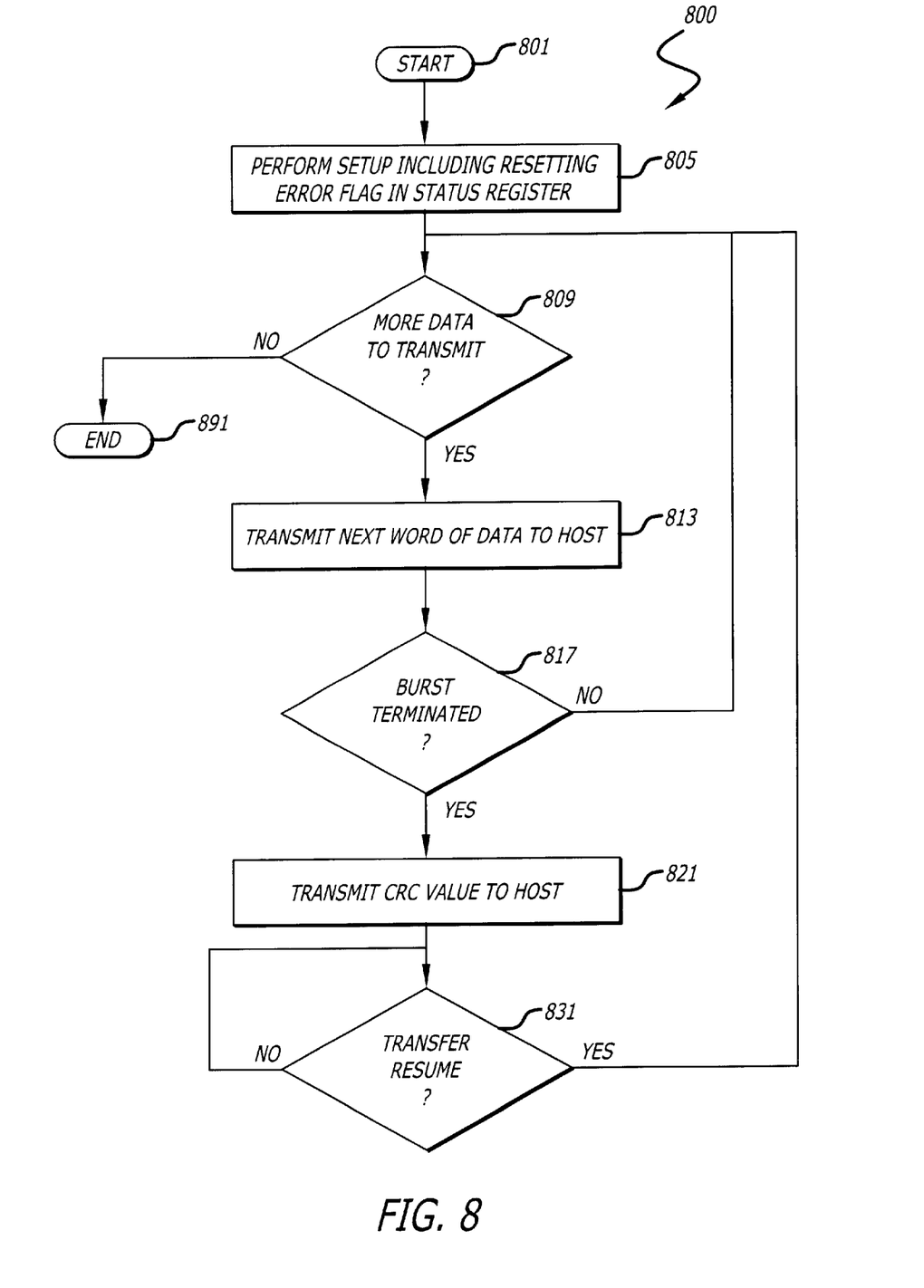
FIG. 8 is a flow diagram of one embodiment of a process performed by a device in accordance with the teachings of the present invention.

FIG. 8 is a flow diagram illustrating the operations on the device side according to the teachings of the present invention. The process 800 starts at block 801 and proceeds to block 805 in response to a read command request issued by the host. At block 805, the device performs setup including resetting the error flag in the status register prior to transferring data to the host. At block 809, if there are more data to transmit to the host, the process 800 proceeds to block 813, otherwise it proceeds to end at block 891. At block 813, the device transmits the next word of data to the host. At block 817, the device proceeds to block 821 if the current data in burst is being terminated by the host. Otherwise the process 800 loops back to block 809 to continue transmitting data to the host. At block 821, the device transmit its CRC value to the host during the termination phase of the current data in burst as described above with respect to FIG. 4. At block 831, the device waits for the transfer to resume.

The invention has been described in conjunction with the preferred embodiment. It is evident that numerous alternatives, modifications, variations and uses will be apparent to those skilled in the art in light of the foregoing description.

What is claimed is:

1. A method comprising:
   in response to a read command issued by a host to a device, transferring data from the device to the host through a series of direct-memory-access (DMA) data in bursts; and
   allowing the host to interrupt the read command and determine whether a first portion has been transferred correctly from the device to the host based upon an error code calculation transmitted from the device to the host during the termination phase of a data in burst.

2. The method of claim 1 wherein transferring data from the device to the host comprises:
   the device asserting a DMA request (DMARQ) signal to initiate the data in burst;
   the host asserting a DMA acknowledge (DMACK) signal in response to the DMARQ signal when the host is ready to begin the requested data in burst;
   the host negating a STOP signal and asserting a DMA ready (HDMARDY) signal within a first predetermined time period after asserting the DMACK signal;
   the device driving a first word of the data transfer onto a bus connecting the device to the host no sooner than a second predetermined time period after the DMACK signal is asserted by the host;
   the device toggling a strobe (DSTROBE) signal no sooner than a third predetermined time period after placing the first word onto the bus to latch the first word into the host; and
   the device driving additional data words onto the bus and toggling the DSTROBE signal to latch the additional words into the host.

3. The method of claim 2 wherein allowing the host to interrupt comprises:
   the host determining whether the first portion of data has been transferred from the device to the host;
   if the first portion has been transferred from the device to the host, the host terminating the data in burst;
   the device transmitting the error code calculation to the host during the termination phase of the data in burst; and
   the host validating the first portion of data based upon the error code calculation received from the device.

4. The method of claim 3 wherein terminating the current data in burst comprises:
   the host negating the HDMARDY signal to pause the data transfer;
   the device stopping the toggling of the DSTROBE signal within a fourth predetermined time period after the host negating the HDMARDY signal;
   the host asserting the STOP signal no sooner than a fifth predetermined time period after negating the HDMARDY signal; and
   the device negating the DMARQ signal within a sixth predetermined time period after the host asserting the STOP signal.

5. The method of claim 4 wherein transmitting the error code calculation comprises:
   the device driving the error code calculation onto the bus; and
   the host latching the error code calculation upon the negating edge of the DMARQ signal.

6. The method of claim 3 further comprising:
   the host keeping track of how much data has been transferred from the device using a list containing one or more entries corresponding to one or more physical memory regions to be transferred.

7. The method of claim 1 wherein the error code is a cyclic redundancy check (CRC) code.

8. The method of claim 1 wherein the CRC code is a 16-bit CRC code.

9. The method of claim 8 wherein both the host and the device calculate a CRC value for each data in burst.

10. A host interface unit to control data transfer between a host and a device, the host interface unit comprising:
    logic to instruct the device to transfer data to the host through a series of direct-memory-access (DMA) data in bursts, in response to a read request from the host; and
    logic to allow the host interface unit to interrupt the data transfer from the device and determine whether a first portion has been transferred correctly from the device to the host based upon an error code calculation transmitted from the device.

11. The host interface unit of claim 10 wherein:
    the device asserts a DMA request (DMARQ) signal to initiate the data in burst;
    the host interface unit asserts a DMA acknowledge (DMACK) signal in response to the DMARQ signal when the host is ready to begin the requested data in burst;
    the host interface unit negates a STOP signal and asserts a DMA ready (HDMARDY) signal within a first predetermined time period after asserting the DMACK signal;
    the device drives a first word of the data onto a bus connecting the device to the host interface unit no sooner than a second predetermined time period after the DMACK signal is asserted by the host interface unit;
    the device toggles a strobe (DSTROBE) signal no sooner than a third period of time after placing the first word onto the bus to latch the first word into the host interface unit; and
    the device drives additional data words onto the bus and toggles the DSTROBE signal to latch the additional words into the host interface unit.

12. The host interface unit of claim 10 wherein the logic to allow the host interface unit to interrupt comprises:
    logic to determine whether the first portion has been transferred to the host interface unit;
    logic to terminate the data in burst in response to a determination that the first portion has been transferred to the host interface unit; and
    logic to validate the first portion transferred from the device.

13. The host interface unit of claim 12 wherein the logic to validate the first portion comprises:
    logic to obtain the error code calculation from the device during the termination phase of the data in burst; and logic to the compare the error code calculation obtained from device with the error code calculated by the host interface unit to determine whether the first portion has been correctly transferred.

14. The host interface unit of claim 10 further comprising:

logic to inform the host in response to the determination that the first portion has been correctly transferred from the device.

15. The host interface unit of claim 14 wherein logic to inform the host comprises:

logic to generate an interrupt signal to the host.

16. The host interface unit of claim 12 wherein, in response to the determination that the first portion has been transferred from the interface:

the host interface unit negates the HDMARDY signal to pause the data transfer;

the device stops toggling the DSTROBE signal within a fourth predetermined time period after the host interface unit negates the HDMARDY signal;

the host interface unit asserts the stop signal no sooner than a fifth predetermined time period after negating the HDMARDY signal; and the device negates the DMARQ signal within a sixth predetermined time period after the host interface unit asserts the STOP signal.

17. The host interface unit of claim 16 wherein the device drives the error code calculation onto the bus and the host interface unit latches the error code calculation upon the negating edge of the DMARQ signal.

18. The host interface unit of claim 10 wherein the error code is a 16-bit CRC code.

19. The host interface unit of claim 18 wherein both the host interface unit and the device calculate a CRC value for each data in burst.

20. A system comprising:

a host;

a memory coupled to the host; and a storage device coupled to the host, wherein, in response to a read command issued by the host, the device transfers data to the host through a series of DMA data in bursts, and wherein the host is allowed to interrupt the read command and determine whether a first portion has been transferred correctly from the device to the host based upon an error code calculation transmitted from the device to the host during the termination phase of a data in burst.

21. The system of claim 20 wherein the host terminates a data in burst in response to a determination that the first portion has been transferred from the storage device, the storage device to transfer an error code calculation for the data in burst during the termination phase of the data in burst.

22. The system of claim 21 wherein the host, upon receiving the error code calculation from the storage device, determines whether the first portion has been transferred correctly from the storage device based upon the error code calculation received from the storage device.

23. The system of claim 22 wherein the host compares the error code calculation from the storage device with an error code calculated by the host to validate the first portion.

24. The system of claim 21 wherein, in response to the determination that the first portion has been transferred from the storage device:

the host negates a DMA ready (HDMARDY) signal;

the storage device stops toggling a strobe (DSTROBE) signal within a first predetermined time period after the HDMARDY signal is negated;

the host asserts a STOP signal no sooner than a second predetermined time period after negating the HDMARDY signal;

the storage device negates a DMA request (DMARQ) signal within a third predetermined time period after the STOP signal is asserted;

the storage device drives the error code calculation onto the bus; and the host latches the error code calculation upon the negating edge of the DMARQ signal.

25. The system of claim 21 wherein the error code is a 16-bit cyclic redundancy check (CRC) code.

* * * * *

UNITED STATES PATENT AND TRADEMARK OFFICE
CERTIFICATE OF CORRECTION

PATENT NO. : 6,567,953 B1
DATED : May 20, 2003
INVENTOR(S) : Pomerantz

It is certified that error appears in the above-identified patent and that said Letters Patent is hereby corrected as shown below:

Column 2,
Line 58, after "transfer", insert -- protocol; --.
Line 60, before "burst", delete "a".

Column 4,
Lines 2, 25 and 27, delete "(10)", insert -- (IO) --.

Signed and Sealed this

Twenty-fifth Day of November, 2003

JAMES E. ROGAN
*Director of the United States Patent and Trademark Office*